June 6, 1950 M. CAWEIN 2,510,070
TELEVISION SCANNING SYSTEM
Filed May 18, 1945 2 Sheets-Sheet 1

INVENTOR
MADISON CAWEIN
BY
ATTORNEY

June 6, 1950     M. CAWEIN     2,510,070
TELEVISION SCANNING SYSTEM
Filed May 18, 1945     2 Sheets-Sheet 2
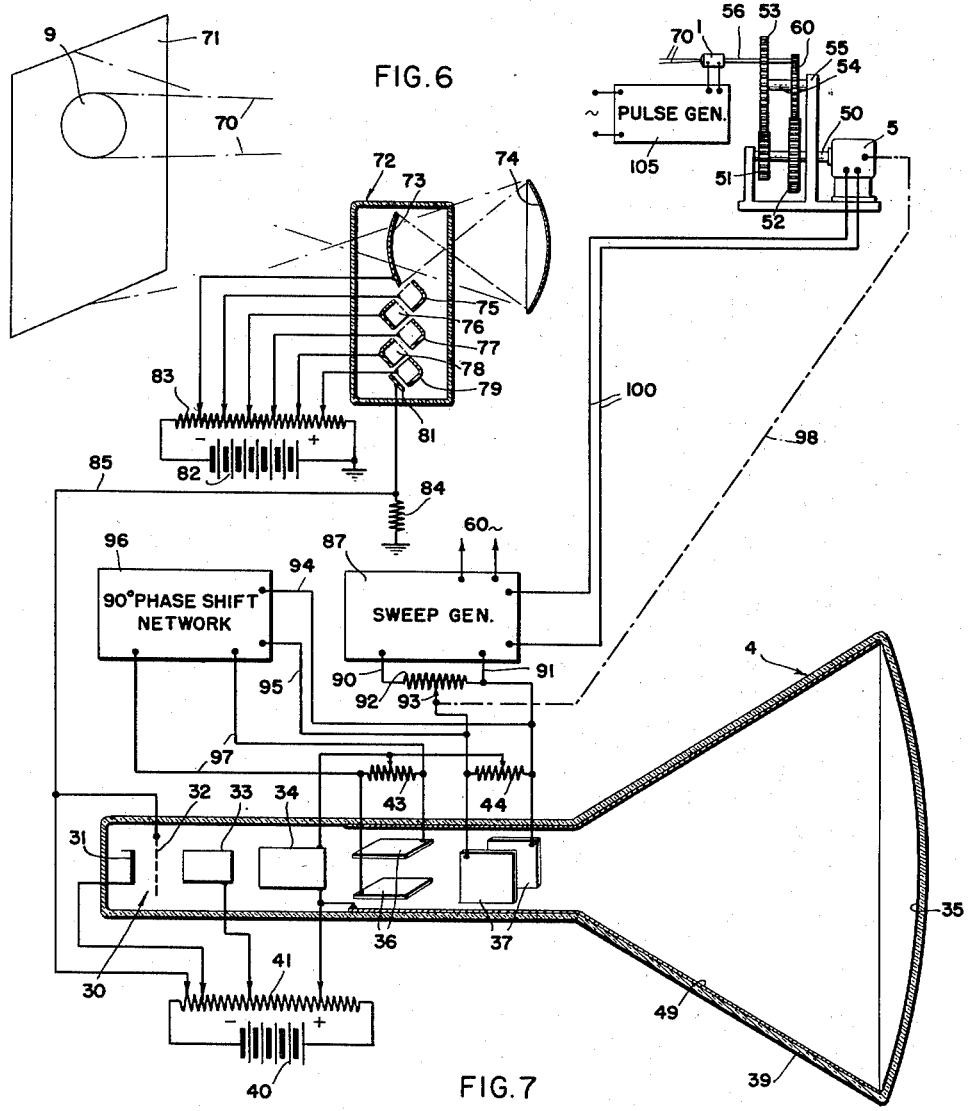
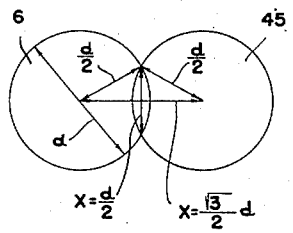
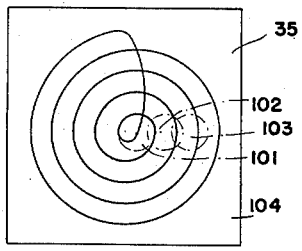
INVENTOR
MADISON CAWEIN
BY
ATTORNEY Patented June 6, 1950

2,510,070

UNITED STATES PATENT OFFICE 2,510,070

TELEVISION SCANNING SYSTEM

Madison Cawein, Fort Wayne, Ind., assignor, by mesne assignments, to Farnsworth Research Corporation, a corporation of Indiana Application May 18, 1945, Serial No. 594,405

4 Claims. (Cl. 178—6.8)

This invention relates to a television scanning system, and more particularly relates to a night vision system for deriving an image of a distant object when conditions of low light intensity prevail.

The problem of reproducing an image of an object during periods of low light levels arises frequently when it is desired, for example, to spot aircraft or ships at night. The scanning system of the invention has also utility for televising outdoor games at times when the illumination might fall below the required level, such as during the late afternoon. In order to maintain secrecy, it is often required to illuminate the object with invisible light of wave lengths in the infra-red region, but for practical purposes it is very difficult to generate a light beam, particularly of infra-red light, which will illuminate the entire object sufficiently to provide the required reflected light. The problem, therefore, arises of collecting a substantial quantity of the light reflected from the object sufficient to reproduce a light image which will reveal details of the object. It is well known that a high definition television picture may only be obtained with a very large number of picture elements. However, the more picture elements are used for reproducing the object the higher must be the illumination level required to obtain picture signals of sufficient amplitude. Hence, in a night vision system the quality of the reproduced picture is determined by the amount of light available to illuminate the object.

It is an object of the present invention to provide a novel night vision system for reproducing an image of a distant object.

Another object of the invention is to provide, in a television system for reproducing an image of a distant object, a novel method of and apparatus for illuminating the object with a light beam and collecting at any instant substantially all of the light reflected from the object for conversion into a visible light image.

A further object of the invention is to provide a television scanning system where the object to be reproduced is scanned by a light beam in accordance with a predetermined scanning pattern, while an optical image of the object is scanned electronically to reveal fine structure within the scanning light spot.

In accordance with the present invention, there is provided a television system for reproducing an image of an object comprising means for generating a light beam and projecting it upon the object, the light beam thus projected subtending an angle smaller than the angle of view of the object area. Means are provided for sweeping the light beam across the object in accordance with a predetermined cyclically recurring scanning pattern. There is further provided a photosensitive member and optical means for projecting an optical image of the entire area of the object upon the photosensitive member to liberate photoelectrons therefrom which are representative of the brightness value of the light reflected from successive areas of the object, as well as means for deriving a signal output from the photosensitive member which is representative of the photoelectrons. There is finally provided a picture signal reproducing tube having a luminescent screen, means for developing an electron beam and focusing it upon the screen, means for controlling the intensity of the electron beam in accordance with the output signal, as well as means for electronically deflecting the electron beam in synchronism with the scanning pattern. In this manner a light image is developed on the luminescent screen which is representative of the object.

In accordance with a preferred embodiment of the invention, a television system for reproducing an image of an object comprises means for generating a light beam and projecting it upon the object, and means for scanning the object with the light beam in accordance with cyclically recurring patterns to cover the entire area of the object during each scanning cycle. A picture signal generating tube is provided which comprises a photosensitive cathode and is associated with optical means for projecting light reflected from the entire area of the object upon the photosensitive cathode. Further means are provided for electronically scanning the entire area of the cathode in accordance with cyclically recurring field patterns having a frequency that is higher than the reciprocal of the time required for the light beam to cover a predetermined area of the object. Also, means are provided which cooperate with the electronic scanning means for developing picture signals representative of the brightness values of the light reflected from the object. Finally, a picture signal reproducing tube is provided which comprises a target, means for developing an electron beam and focusing it upon the target, as well as means for scanning the target with an electron beam in synchronism with the field patterns. The intensity of the electron beam is controlled in accordance with the picture signals. In this manner an image is reproduced on the target that reveals details within the light spots produced by the light beam and reflected from the object.

For a better understanding of the invention, together with other and further objects thereof, reference is made to the following description, taken in connection with the accompanying drawings, and its scope will be pointed out in the appended claims.

In the accompanying drawings:

Fig. 4 shows two different positions of the scanning light spot which will be referred to in explaining the operation of the invention;

Fig. 6 is a schematic representation of a modified television scanning system embodying the invention; and Fig. 7 illustrates the image visible at a particular instant on the screen of the picture signal reproducing tube of Fig. 6.

Figures 1, 2, 3, 5:
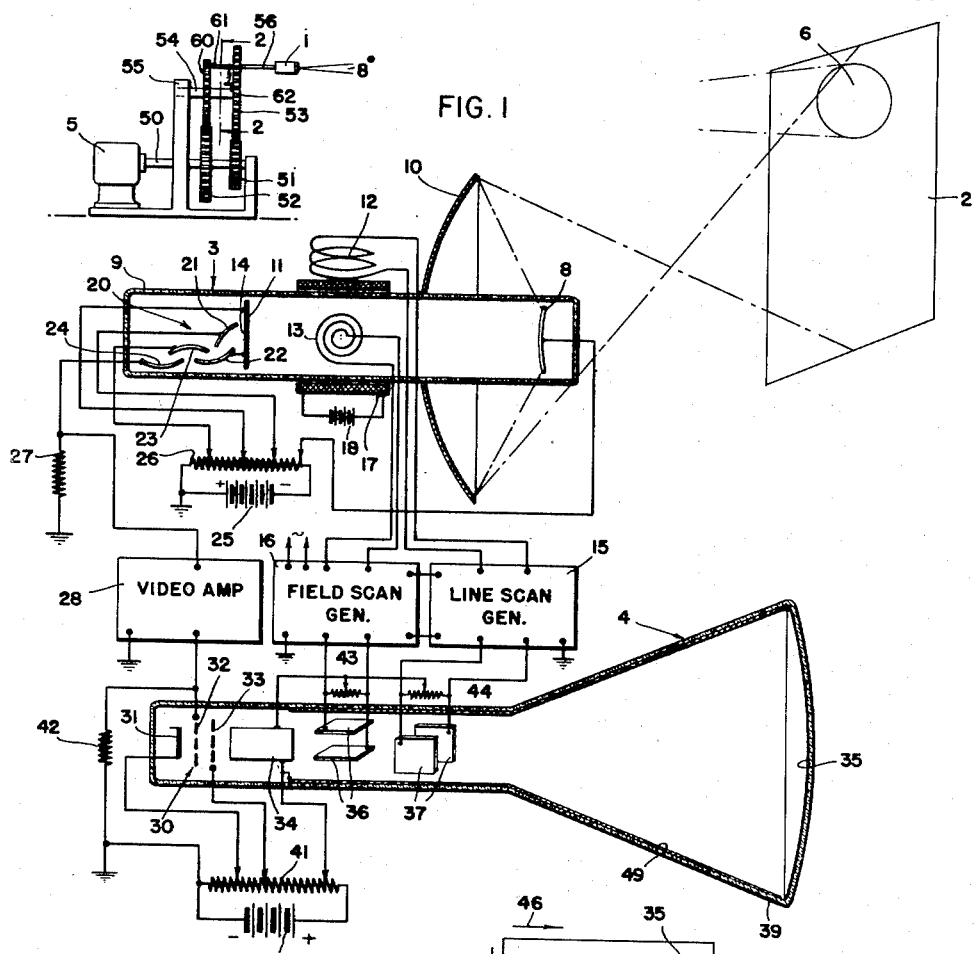
Fig. 1 is a schematic representation of a television scanning system in accordance with the invention.
Fig. 2 is a front elevational view taken on line 2—2 of Fig. 1 and illustrating a spiral groove in a gear.
Fig. 3 illustrates the scanning pattern traced by the light spot illuminating the object to be reproduced.
Fig. 5 illustrates the image visible at a particular instant on the screen of the picture signal reproducing tube of Fig. 1.

Referring now more particularly to Fig. 1 of the drawings, there is illustrated a television scanning system including light source 1 arranged for projecting a light beam upon a distant object schematically represented at 2, a television picture signal generating tube 3 arranged for receiving light from object 2 and a picture signal reproducing tube 4 for reproducing an image of object 2. Light source 1 is mechanically connected in a manner to be explained hereinafter with electric motor 5, which may be a synchronous motor, for moving light spot or flying spot 6 across object 2 in accordance with a predetermined pattern.

The television system of the invention has particular utility for reproducing a distant object during total darkness. For secrecy purposes it may be preferred to utilize a light source which illuminates object 2 with invisible light. Thus, for instance, light source 1 may generate light having a wave length of between 8,000 to 10,000 Angstrom units, that is, within the near infrared spectral range. Light source 1 projects a beam of light which may subtend an angle of approximately 8 degrees as indicated. Thus, the area of object 2 is appreciably larger than the cross-sectional area of the light beam projected by light source 1. The connection between light source 1 and synchronous motor 5 is such that light spot 6 traverses the entire area of object 2 in a cyclically recurring path which may, for instance, be a spiral pattern.

To this end synchronous motor 5 drives shaft 50, having secured thereto gears 51 and 52. Gear 51 engages gear 53, secured to shaft 54 journalled in bearing 55. Light source 1 is secured to lever 56 pivotally mounted in a slot in gear 53. The free end of lever 56 extends through gear 53 and engages groove 57 provided in gear 60 meshing with gear 52, as illustrated particularly in Fig. 2. Gear 60 rotates freely on shaft 54 so that gear 60 can rotate at a rate different from that of gear 53 on shaft 54. Spring 61, having its ends secured to lever 56 and to pin 62 on gear 53, urges the free end of lever 56 towards shaft 54 and thus keeps lever 56 in groove 57. When gear 53 rotates, light source 1 is normally carried around shaft 54 in a circle. When gear 60 has a rotational speed that differs from that of gear 53, groove 57 will move relatively to the free end of lever 56.

Thus, light source 1 can be made to rotate about the surface of a cone, provided the angle that lever 56 forms with gear 53 differs from a right angle. By suitably shaping groove 57, light spot 6 may be made to traverse the area of object 2 in accordance with any desired scanning path. A closed spiral scanning path 7 which the center of light spot 6 may traverse is shown schematically in Fig. 3.

The scanning pattern of light spot 6 may consist, for example, of four lines or revolutions per field so that the entire area of object 2 is scanned in four revolutions. This may require two seconds so that light spot 6 revolves once in one-half second. In that case, gear 53 should be arranged to rotate once every half second, that is, at the rate of 120 revolutions per minute. Gear 60, on the other hand, should rotate at such a speed that when gear 53 has completed four revolutions, that is every two seconds, gear 60 has either advanced or been retarded by one revolution with respect to gear 53. Thus, gear 60 may be arranged to rotate either at the rate of 150 or 90 revolutions per minute so that the scanning pattern traced by light spot 6 is completed in two seconds.

The light reflected from object 2, which may be an appreciable distance from light source 1, is projected upon photosensitive cathode 8 of picture signal generating tube 3 by reflecting mirror 10. Reflecting mirror 10 is arranged to collect light from the entire area of distant object 2 and focus it upon photosensitive cathode 8. If light source 1 is arranged to project infrared light, photosensitive cathode 8 should be responsive to the infra-red light reflected from object 2.

Television picture signal generating tube 3 may be of any conventional type including tubes of the light storage type. Picture signal generating tube 3, illustrated in Fig. 1, is an image dissector tube which operates in a conventional manner. The light focused by mirror 10 upon photosensitive cathode 8 liberates photoelectrons therefrom to develop an electron image which is accelerated by anode 11. Two pairs of scanning coils 12 and 13 are provided for scanning the electron image in two directions across aperture 14 in accelerating anode 11. Horizontal scanning coils 12 are connected to line scanning generator 15, and vertical scanning coils 13 are connected to field scanning generator 16. Horizontal scanning coils 12 energized by line scanning generator 15 create a magnetic field for horizontally deflecting the electron image across aperture 14. At the same time the electron image is scanned vertically at a lower rate across aperture 14 by the magnetic field created by vertical scanning coils 13 connected to field scanning generator 16. The selected electrons pass through aperture 14 and thus picture signals representative of the instantaneous brightness values of elemental areas of cathode 8 are developed, the size of the elemental areas depending upon the dimensions of aperture 14. Focusing coil 17 energized by a current source such, for example, as battery 18 is provided outside envelope 9 of tube 3 for focusing the electron image upon aperture 14.

The frequency of the scanning waves generated by field generator 16 should bear a certain relationship to the movement of light spot 6 across object 2. Let it be assumed that light spot 6 traverses object 2 in a spiral scanning pattern, such as illustrated in Fig. 3. If we suppose that the light spot starts in the position indicated at 6, then after a full revolution equivalent to one scanning line the light spot will be in the position indicated at 45. The two positions of the light spot shown at 6 and 45 have a 50% overlap. Expressed in a different way, when the light spot travels from position 6 to position 45 it has traversed 86.6% of its own angular width.

This relationship may be explained with reference to Fig. 4, showing schematically the light spot in two different positions 6 and 45 with a 50% overlap. If $d$ is the diameter of the light spot, it will be seen that the distance $y$ between the centers of the two positions of the light spot equals $$\frac{\sqrt{3}}{2}d$$

which in turn equals $.866d$. The common chord $x$ of light beams 6 and 45 equals $$\frac{d}{2}$$

which is the equivalent of the expression used hereinabove that the two positions 6 and 45 of the light spot have a 50% overlap. Preferably, the frequency of the scanning waves generated by field scanning generator 16 should be greater than the reciprocal of the time required for the light beam to traverse 86.6% of its own width, that is the distance $y$. If we assume a spiral scanning pattern, this distance corresponds to about a full revolution of light spot 6 near the center of spiral scanning path 7. Near the outside of scanning path 7 light spot 6 traverses 86.6% of its own width in much less than a full revolution.

The frequency of the scanning waves generated by line scanning generator 15, preferably, is a multiple of that of field scanning generator 16, such as 100 times or, preferably, 400 times the frequency of field scanning generator 16. During each electronic field scanning cycle the entire area of the electron image developed in image dissector tube 3 is scanned once. Thus, the frequency of the scanning waves generated by field scanning generator 16 may be 30 cycles per second, which is more than the reciprocal of the time required by the light beam to traverse 86.6% of its own width at any portion of scanning path 7. The frequency of line scanning generator 15 would then be 12,000 cycles per second. Thus, the entire cathode area is scanned rapidly for detail. Light spot 6 is scanned during each electronic field scanning cycle by approximately 70 horizontal lines, because each light spot 6 covers roughly ⅛ of the height of object 2.

Preferably, an electron multiplier 20 is arranged behind aperture 14 for amplifying the picture signals. Electron multiplier 20 comprises multiplier stages 21, 22, 23 and electron collector 24. For the purpose of providing operating potentials to the electrodes of image dissector tube 3 and of multiplier 20, there is provided a voltage source such, for example, as battery 25 connected across potentiometer 26 and having its positive terminal grounded. By means of a tap connected to potentiometer 26, cathode 8 may be kept at a potential that is approximately 1,000 volts negative against ground, while anode 11 may be maintained at a potential of approximately 400 volts negative against ground. Multiplier stage 21 may be kept at a potential of approximately 600 volts negative against ground, and each succeeding multiplier stage may have a potential that is 200 volts positive against the preceding stage. Thus, multiplying stage 22 may be connected to anode 11 and hence has the same potential as the anode. Electron collector 24 is connected to ground through load resistor 27. The output signal is developed across load resistor 27 and may be connected to video amplifier 28 for further amplification thereof.

Picture signal reproducing tube 4 is arranged for reproducing the picture signals developed across load resistor 27 and amplified by video amplifier 28. To this end reproducing tube 4 is provided with electron gun 30 comprising cathode 31, control grid 32, first anode 33 and second anode 34. The electron beam developed by electron gun 30 is directed and focused upon luminescent screen 35 arranged opposite electron gun 30. Luminescent screen 35 is usually referred to as a fluorescent screen although it has an appreciable persistence time. The electron beam developed and focused by electron gun 30 is deflected in two directions at right angles to each other by means of deflectors 36 and 37. Deflecting plates 36 are connected to field scanning generator 16, while deflecting plates 37 are connected to line scanning generator 15. It will be obvious that for creating a magnetic field by means of scanning coils 12 and 13, field scanning generator 16 and line scanning generator 15 have to supply sawtooth current waves. On the other hand, deflecting plates 36 and 37 require sawtooth voltage waves for creating an electric deflecting field. However, the sawtooth voltage waves required for deflecting plates 36 and 37 may be developed across impedances forming part of generators 15 and 16 through which the sawtooth current waves flow.

For the purpose of providing operating potentials to the electrodes of electron gun 30 and to deflecting plates 36 and 37, there is provided a suitable voltage source such, for example, as battery 40 connected across potentiometer 41. Control grid 32 is grounded through grid lead resistor 42 and connected in turn to the negative terminal of battery 40. Cathode 31 is maintained a few volts positive with respect to control grid 32. First anode 33 may be kept at a potential approximately 150 volts positive against that of cathode 31, while second anode 34 may be kept at a potential of approximately 1,000 volts positive with respect to cathode 31. Anode 34 is connected to electrode 49 which may consist of a metallic wall coating arranged on the inner surface of envelope 39 of tube 4. The leads connecting deflecting plates 36 to field scanning generator 16 are shunted through resistor 43 having a center tap connected to anode 34. Similarly, the leads connecting line scanning generator 15 to deflecting plates 37 are shunted through resistor 44 having a center tap also connected to anode 34. Hence, deflecting plates 36 and 37 have an average potential which equals that of anode 34.

The operation of picture signal reproducing tube 4 is conventional. The electron beam developed by electron gun 30 is focused upon luminescent screen 35 and deflected by deflecting plates 36 and 37 in synchronism with the deflection of the electron image developed in image dissector tube 3 and scanned across aperture 14. The intensity of the electron beam is controlled by control grid 32 connected to video amplifier 28 in accordance with the picture signals generated in dissector tube 3.

Fig. 5 illustrates the scanning pattern visible at a certain instant on luminscent screen 35 of reproducing tube 4. During one field scanning period the scanning spot moves from position 6 to position 45. The entire field of view is scanned in the horizontal direction as indicated by arrow 46 and simultaneously in the vertical direction as indicated by arrow 47. Hence, it will be seen that, although the entire field of view of object 2 is scanned slowly by the relatively large light spot 6, horizontal scanning lines 48 reveal detail structure within the scanning spot. Preferably, the persistence time of luminescent screen 35 matches or equals the time required for light spot 6 to traverse the entire area of object 2 so that all the partial pictures corresponding to the different positions of light spot 6 overlap and that the entire area of object 2 is visible simultaneously on screen 35. Thus, when light spot 6 covers the entire area of object 2 in two seconds, the persistence time of luminescent screen 35 should also be two seconds.

It is to be understood that reflecting mirror 10 may be replaced by a suitable lens system. However, a reflecting mirror is preferred due to its larger light collecting power. The term light beam as used in the claims is meant to include all forms of radiant energy such as infra-red and ultra-violet light.

Referring now to Fig. 6 of the drawings, there is shown a modified television scanning system embodying the present invention which has particular utility as a night vision system. The night vision system of Fig. 6 comprises light source 1 arranged for generating light beam 70 and projecting it upon object 71, photocell multiplier 72 and picture signal reproducing tube 4. Light source 1 is arranged to operate in the manner disclosed in Figs. 1 and 2 to sweep light beam 70 across distant object 71 in accordance with a spiral scanning pattern of the type disclosed in connection with Figs. 1 and 3. Preferably, light source 1 generates light having a wave length of between 8,000 to 10,000 Angstrom units, that is, within the near infra-red spectral range. The angle subtended by light beam 70 may be approximately 8 degrees or less which is substantially smaller than the angle of view of object 71.

Photocell multiplier 72 is associated with optical means for focusing an optical image of the entire area of object 71 on photosensitive cathode 73. To this end there is provided reflecting mirror 74 which has a large light collecting power. In any instant, the light projected by light beam 70 onto object 71 and reflected thereby is optically focused onto photosensitive cathode 73. The light focused upon photosensitive cathode 73 liberates photoelectrons which are fed into multiplier stages 75, 76, 77, 78 and 79 to multiply the photoelectrons which are then collected by electron collector 81. If the light of beam 70 is infra-red, photocathode 73 should be predominantly responsive to infra-red light.

For the purpose of supplying operating potentials to photocathode 73 and multiplier stages 75 to 79, there is provided a voltage source such, for example, as battery 82 connected across potentiometer 83 and having its positive terminal grounded as shown. The electrodes of photocell multiplier 72 are connected to potentiometer 83 by means of suitable taps in such a manner that cathode 73 is maintained at the most negative potential, while each subsequent multiplying stage is kept at a potential that is positive with respect to that of the preceding stage. Electron collector 81, being at a more positive potential than last multiplier stage 79, is connected to ground through load resistor 84. The output signal developed across load resistor 84 may be obtained from lead 85. Picture signal reproducing tube 4 may be substantially identical to reproducing tube 4 shown in Fig. 1, and like components thereof are designated by the same reference numerals as were used in Fig. 1.

In accordance with the present invention, the electron beam developed by electron gun 30 is deflected in synchronism with the scanning pattern traced by light beam 70. To this end there is provided sweep generator 87 having a sinusoidal voltage wave output obtained from terminals 90 and 91 shunted by resistor 92. Deflecting plates 37, 37 are individually connected to terminal 91 and variable tap 93 of resistor 92. Leads 94 and 95, connected to lead 91 and variable tap 93, respectively, are connected to 90 degrees phase shift network 96. The output of phase shift network 96 obtained from leads 97, 97 is connected to deflecting plates 36, 36.

Let us assume for a moment that variable tap 93 of resistor 92 is fixed. Then a sinusoidal voltage wave of constant amplitude is impressed upon deflecting plates 37, and the same voltage wave shifted through 90 degrees by means of network 96 is connected to deflecting plates 36. As long as the amplitude of the voltage wave generated by sweep generator 87 remains constant, the electric fields created by deflecting plates 36 and 37 will cause the electron beam to trace a circle upon screen 35. However, when the amplitude of the voltage wave derived from sweep generator 87 varies, the electron beam will trace a spiral pattern on screen 35. In order to sweep the electron beam across screen 35 in a spiral pattern, tap 93 is connected to electric motor 5 by means of a mechanical connection schematically indicated at 98. In order to insure that electric motor 5 operates in synchronism with sweep generator 87, motor 5 is preferably energized from the same source as sweep generator 87.

The night vision system illustrated in Fig. 6 operates in the following manner. Electric motor 5, energized by leads 100 from sweep generator 87, moves light source 1 so that light beam 70 traces a predetermined scanning pattern, such as the spiral pattern illustrated in Fig. 3. The scanning pattern traced by light beam 70 may have substantially the same rates as described in connection with Fig. 1. Thus, light beam 70 may trace a spiral pattern on object 71 consisting of four revolutions which require a total time of two seconds so that each revolution is traced across object 71 in one-half second. At any instant the light reflected from object 71 is focused by reflecting mirror 74 onto photocathode 73 to liberate photoelectrons therefrom. The photoelectrons are multiplied in multiplier stages 75 to 79 and the resulting current is collected by electron collector 81. The output signal developed across load resistor 84 is connected by lead 85 to control grid 32 of picture signal reproducing tube 4. Accordingly, the intensity of the electron beam developed by electron gun 30 is controlled in accordance with the brightness value of the light projected by beam 70 and reflected from successive areas of object 71. It will be understood that the signal output of photocell multiplier 72 is integrated, that is, for each position of light beam 70 the output signal corresponds to the integrated or averaged brightness value of the reflected light.

It will be evident from the above explanation that control grid 32 of picture signal reproducing tube 4 is driven more negative when more light is projected onto photocathode 73 of photocell multiplier 72. Accordingly, the electron beam controlled by grid 32 has a reduced intensity when the intensity of the light reflected from object 71 increases, and thus screen 35 shows a negative image of object 71. This may not be objectionable in some cases. However, a positive image may be obtained on screen 35 by inserting an amplifier stage, such as shown at 28 in Fig. 1, in lead 85 between electron collector 81 and control grid 32. Alternatively, the signal polarity applied to control grid 32 may also be reversed by connecting lead 85 to last multiplier stage 79 instead of connecting it to electron collector 81, as shown in the drawings. It is well known that the signal polarity obtained from the last multiplying stage of an electron multiplier is opposite from that obtained from the electron collector thereof.

The electron beam developed in picture signal reproducing tube 4 sweeps across luminescent screen 35 in accordance with the same scanning pattern traced by light beam 70 across object 71. This is achieved by feeding deflecting plates 36 with a voltage wave that is 90 degrees out of phase with respect to that supplied to deflecting plates 37. The amplitude of the voltage waves supplied to deflecting plates 36 and 37 is continuously varied in unison by means of variable tap 93 mechanically connected to motor 5 through connection 98.

The image seen on screen 35 is shown in Fig. 7. Subsequent positions of the electron beam are illustrated at 101, 102 and 103. The center of the electron beam moves along scanning path 104 which may be identical with scanning path 7 illustrated in Fig. 3. Preferably, the area which the electron beam covers on screen 35 bears the same ratio to the entire area of screen 35 as the area covered by beam 70 with respect to the entire area of object 71. Accordingly, the electron beam has a comparatively large cross-section.

The time of persistence of luminescent screen 35 should preferably match or equal the time required to scan object 71 once. If this condition is fulfilled, flicker can be minimized because all the extended overlapping image areas of which the image is composed are seen simultaneously on screen 35. Thus, if object 71 is scanned once every two seconds, the persistence time of screen 35 should also be two seconds. In some cases it may be preferred to adjust the scanning frequency to the time of persistence of screen 35.

In order to obtain a higher illumination level it may be desirable to periodically interrupt light beam 70. If light beam 70 is interrupted at a predetermined rate, a greater light intensity may be obtained because a larger light current may be passed through light source 1 when the current is interrupted than when the current flows continuously. This is particularly important when light source 1 projects infra-red light. Light beam 70 may be interrupted by pulse generator 105 connected to light source 1. The rate of interruption of beam 70 should be incommensurable with the frequency of the scanning pattern traced by beam 70 so that every point of object 71 receives a pulse of light during successive scannings but within the persistence time of screen 35.

It is to be understood that photocell multiplier 72 may also be replaced by a photoelectric tube, the output of which may be amplified by conventional means. If light beam 70 is periodically interrupted by pulse generator 105, this amplifier could be made responsive only to the frequency of interruption of light beam 70.

While there has been described what are at present considered the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A television system for reproducing an image of a distant object comprising means for generating a light beam and projecting it upon said object, and means for optically scanning said object with said light beam in accordance with cyclically recurring spiral patterns to cover the entire area of said object during each frame scanning cycle; a picture signal generating tube comprising a photosensitive cathode, optical means associated with said picture signal generating tube for projecting light reflected from the entire area of said object upon said cathode, means for electronically scanning the entire area of said cathode in accordance with cyclically recurring field patterns having a frequency that is higher than the reciprocal of the time required for said light beam to cover a major portion of its angular width, and means cooperating with said electronic scanning means for developing picture signals representative of the brightness values of the light reflected from said object; and a picture signal reproducing tube comprising a target, means for developing an electron beam and focusing it upon said target, means for scanning said target with said electron beam in synchronism with said field patterns, and means for controlling the intensity of said electron beam in accordance with said picture signals, thereby to reproduce an image on said target that reveals details within the light spots produced by said light beam and reflected from said object.

2. A television system for reproducing an image of a distant object comprising means for generating a light beam and projecting it upon said object, and means for optically scanning said object with said light beam in accordance with cyclically recurring spiral patterns to cover the entire area of said object during each frame scanning cycle with a continuous overlapping light spot; a picture signal generating tube comprising a photosensitive cathode, optical reflecting means associated with said picture signal generating tube for projecting light reflected from the entire area of said object upon said cathode, means for electronically scanning the entire area of said cathode in accordance with cyclically recurring field patterns having a frequency that is higher than the reciprocal of the time required for said light beam to cover a major portion of its angular width, and means cooperating with said electronic scanning means for developing picture signals each being representative of the brightness values of the light reflected from an elemental area of said object, said elemental areas having a smaller angular width than the light spot produced by said light beam; and a picture signal reproducing tube comprising a luminescent screen having a persistence time that approximately equals the time required to scan said object with said light beam once, means for developing an electron beam and focusing it upon said screen, means for scanning said screen with said electron beam in synchronism with said field patterns, and means for controlling the intensity of said electron beam in accordance with said picture signals, thereby to reproduce an image on said screen that reveals details within the light spots produced by said light beam and reflected from said object.

3. A television system for reproducing an image of a distant object comprising means for generating a light beam and projecting it upon said object, and means for optically scanning said object with said light beam in accordance with cyclically recurring spiral patterns to cover the entire area of said object during each frame scanning cycle with a continuously traveling light spot overlapping approximately half its diameter; a picture signal generating tube comprising a photosensitive cathode, optical means associated with said picture signal generating tube for projecting light reflected from the entire area of said object upon said cathode, means for electronically scanning the entire area of said cathode in accordance with cyclically recurring field patterns having a frequency that is higher than the reciprocal of the time required for said light beam to traverse about 85% of its angular width, and means cooperating with said electronic scanning means for developing picture signals representative of the brightness values of the light reflected from said object; and a picture signal reproducing tube comprising a luminescent screen having a persistence time that approximately equals the time required to scan said object with said light beam once, means for developing an electron beam and focusing it upon said screen, means for scanning said screen with said electron beam in synchronism with said field patterns, and means for controlling the intensity of said electron beam in accordance with said picture signals, thereby to reproduce an image on said screen that reveals details within the light spots produced by said light beam and reflected from said object.

4. A television system for reproducing an image of a distant object comprising means for generating a relatively coarse light beam subtending an angle smaller than the angle of view of the area of said object, projecting said light beam upon said object, and means for optically scanning said object with said light beam in accordance with cyclically recurring spiral patterns to cover the entire area of said object during each frame scanning cycle with a continuous overlapping light spot; a picture signal generating tube comprising a photosensitive cathode, optical reflecting means associated with said picture signal generating tube for projecting light reflected from the entire area of said object upon said cathode, means for electronically scanning successive elemental areas of said cathode in accordance with cyclically recurring field patterns each covering the entire area of said cathode and having a frequency that is higher than the reciprocal of the time required for said light beam to cover a major portion of its angular width, and means cooperating with said electronic scanning means for developing picture signals each being representative of the brightness values of the light reflected from a relatively fine elemental area of said object; and a picture signal reproducing tube comprising a luminescent screen having a persistence time that approximately equals the time required to scan said object with said light beam once, means for developing an electron beam and focusing it upon said screen, means for scanning said screen with said electron beam in synchronism with said field patterns, and means for controlling the intensity of said electron beam in accordance with said picture signals, thereby to reproduce an image on said screen that reveals details within the light spots produced by said light beam and reflected from said object.

MADISON CAWEIN.

REFERENCES CITED

The following references are of record in the file of this patent:

UNITED STATES PATENTS

| Number | Name | Date |
|---|---|---|
| Re. 16,790 | Jenkins | Nov. 22, 1927 |
| Re. 20,239 | Mertz | Jan. 12, 1937 |
| 1,725,710 | Hammond | Aug. 20, 1929 |
| 1,781,799 | Baird | Nov. 18, 1930 |
| 1,936,514 | Lengnick | Nov. 21, 1933 |
| 1,957,953 | Gray | May 8, 1934 |
| 2,006,124 | Baird | June 25, 1935 |
| 2,028,475 | Rockwell | Jan. 21, 1936 |
| 2,082,339 | Ives | June 1, 1937 |
| 2,121,771 | Jones | June 21, 1938 |
| 2,153,918 | Farnsworth | Apr. 11, 1939 |
| 2,178,758 | Kell | Nov. 7, 1939 |
| 2,191,565 | Henroteau | Feb. 17, 1940 |
| 2,201,069 | Wolff | May 14, 1940 |
| 2,215,365 | Vestergren | Sept. 17, 1940 |
| 2,270,232 | Rosenthal | Jan. 20, 1942 |
| 2,277,516 | Henroteau | Mar. 24, 1942 |
| 2,290,592 | Huffman | July 21, 1943 |
| 2,315,291 | Mattke | Mar. 30, 1943 |
| 2,415,390 | Konkle | Feb. 4, 1947 |